United States Patent
Krolak et al.

(10) Patent No.: US 8,345,454 B1
(45) Date of Patent: Jan. 1, 2013

(54) ARCHITECTURE AND CONTROL METHOD FOR DYNAMICALLY CONDITIONING MULTIPLE DC SOURCES TO DRIVEN AN AC LOAD

(75) Inventors: Matthew J. Krolak, Renton, WA (US); John M. Fifield, Kent, WA (US); Shengyi Liu, Sammamish, WA (US)

(73) Assignee: The Boeing Company, Chicago, IL (US)

( * ) Notice: Subject to any disclaimer, the term of this patent is extended or adjusted under 35 U.S.C. 154(b) by 178 days.

(21) Appl. No.: 12/623,372

(22) Filed: Nov. 21, 2009

(51) Int. Cl.
*H02M 7/48* (2007.01)

(52) U.S. Cl. .......................... 363/71; 307/31

(58) Field of Classification Search ............... 307/31; 363/71, 79, 95, 142, 40
See application file for complete search history.

(56) References Cited

U.S. PATENT DOCUMENTS

| 6,503,649 | B1 | 1/2003 | Czajkowski et al. | |
|---|---|---|---|---|
| 2007/0159866 | A1* | 7/2007 | Siri | 363/95 |
| 2008/0205096 | A1* | 8/2008 | Lai et al. | 363/40 |
| 2008/0291707 | A1* | 11/2008 | Fang | 363/41 |
| 2011/0026281 | A1* | 2/2011 | Chapman et al. | 363/65 |

* cited by examiner

*Primary Examiner* — Daniel Cavallari
(74) *Attorney, Agent, or Firm* — Ameh IP; Elahe Toosi; Lowell Campbell

(57) ABSTRACT

A power electronics and control architecture for powering an AC load from a multi-source power system through a single conversion stage is disclosed. A controllable DC-to-AC inverter accepts a DC output voltage range from a DC power source at a DC input, and outputs an adjustable AC at an AC output. A sensor measures an output power of the DC power source to obtain a measured output power, and a processor sets a power level at the DC input based on the measured output power. The processor sets the power level to control the output power of the DC power source, and synchronizes the adjustable AC to a common AC output of the multi-source power system.

10 Claims, 6 Drawing Sheets

US 8,345,454 B1

ARCHITECTURE AND CONTROL METHOD FOR DYNAMICALLY CONDITIONING MULTIPLE DC SOURCES TO DRIVEN AN AC LOAD

FIELD

Embodiments of the present disclosure relate generally to electric power conversion. More particularly, embodiments of the present disclosure relate to power conversion utilizing a DC-to-AC converter.

BACKGROUND

In order to drive an alternating current (AC) load such as a motor with a direct current (DC) power source such as a fuel cell, DC-to-AC conversion is generally necessary. If there are multiple DC power sources of different power and DC voltage levels that are to be combined to drive the AC load, then a power sharing system will generally be needed. Parallel connections are often used for the power sharing system since each DC power source can generally operate independently. Power busses are more commonly AC, and since a parallel AC connection requires a common AC voltage, the various DC voltage levels from the multiple DC power sources should be converted to a common AC voltage.

Existing solutions use a custom DC-to-DC converter with its own control loop to condition an output of a single power module (e.g., fuel cell stack). Existing solutions also employ a separate custom DC-to-AC inverter to generate an AC output voltage, and use an additional controller to coordinate the action of the custom DC-to-DC converter and the custom DC-to-AC inverter. If an existing power sharing system consists of multiple DC power sources of different sizes and voltage levels, a custom DC-to-DC converter with its own control loop and a separate custom DC-to-AC inverter is generally used for each DC power source.

Limitations of existing solutions can include reliance on costly custom designed DC-to-DC converter power conditioners and DC-to-AC inverters, and a substantial time that may be required to design them. A complicated architecture may also be difficult to use for power sharing control of multiple DC power sources with different power and voltage levels. Furthermore, existing solutions may not provide a means to readily consolidate sensor data, which is generally necessary for power sharing at different power levels. Existing solutions also may not provide dynamic adjustment of power sharing ratios for each DC power source such that different source power levels can be successfully interfaced.

Therefore, there is a need for low cost power sharing systems that provide simplified architectures for power sharing at different power levels and for dynamic adjustment of power sharing ratios.

SUMMARY

A power electronics and control architecture for powering an AC load from a multi-source power system through a single conversion stage is disclosed. A controllable DC-to-AC inverter accepts a DC output voltage range from a DC power source at a DC input, and outputs an adjustable RMS current or voltage at an AC output. Based on a measured output of the DC power source, a processor sets a power level at the DC input to control an output power of the DC power source, and synchronizes the adjustable RMS current or voltage to a common AC output of the multi-source power system.

In a first embodiment, a power electronics and control system powers an AC load from multiple DC power sources through a single conversion stage. DC power sources each with a DC electrical output provide electrical power to controllable DC-to-AC inverters each with a control signal input. A plurality of sensors measure at least one characteristic of the DC electrical output of each of the DC power sources, and a processor generates a control signal for the control signal input of each of the controllable DC-to-AC inverters based on the at least one characteristic of the respective DC electrical output of each of the DC power sources.

In a second embodiment, a power electronics and control architecture powers an AC load from a multi-source power system through a single conversion stage. A controllable DC-to-AC inverter accepts a DC output voltage range from a DC power source at a DC input, and outputs an adjustable AC at an AC output. A sensor measures an output power of the DC power source to obtain a measured output power. A processor sets a power level at the DC input based on the measured output power to control the output power of the DC power source, and synchronizes the adjustable AC to a common output of the multi-source power system.

In a third embodiment, a method optimizes output of multiple DC power sources by controlling DC-to-AC inverters. AC sensor data is received from an AC power bus coupled to an AC output of a DC-to-AC inverter. A difference between a set point and an RMS value of the AC sensor data is calculated to obtain a difference value, and the difference value is adjusted by an outer loop compensation value to obtain a power command output. A DC-to-AC inverter control signal is determined based on the power command output.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF DRAWINGS

A more complete understanding of embodiments of the present disclosure may be derived by referring to the detailed description and claims when considered in conjunction with the following figures, wherein like reference numbers refer to similar elements throughout the figures. The figures are provided to facilitate understanding of the disclosure without limiting the breadth, scope, scale, or applicability of the disclosure. The drawings are not necessarily made to scale.

DETAILED DESCRIPTION

The following detailed description is exemplary in nature and is not intended to limit the disclosure or the application and uses of the embodiments of the disclosure. Descriptions of specific devices, techniques, and applications are provided only as examples. Modifications to the examples described herein will be readily apparent to those of ordinary skill in the art, and the general principles defined herein may be applied to other examples and applications without departing from the spirit and scope of the disclosure. Furthermore, there is no intention to be bound by any expressed or implied theory presented in the preceding field, background, summary or the following detailed description. The present disclosure should be accorded scope consistent with the claims, and not limited to the examples described and shown herein.

Embodiments of the disclosure may be described herein in terms of functional and/or logical block components and various processing steps. It should be appreciated that such block components may be realized by any number of hardware, software, and/or firmware components configured to perform the specified functions. For the sake of brevity, conventional techniques and components related to control systems, electrical systems, and other functional aspects of the systems (and the individual operating components of the systems) may not be described in detail herein. In addition, those skilled in the art will appreciate that embodiments of the present disclosure may be practiced in conjunction with a variety of different control systems, electrical systems, and that the system described herein is merely one example embodiment of the disclosure.

Embodiments of the disclosure are described herein in the context of practical non-limiting applications, namely, fuel cell power sharing. Embodiments of the disclosure, however, are not limited to such fuel cell applications, and the techniques described herein may also be utilized in other power sharing applications. For example, embodiments may be applicable to solar energy systems, batteries, hybrid and battery powered vehicles, aircraft systems, generators, and the like.

As would be apparent to one of ordinary skill in the art after reading this description, the following are examples and embodiments of the disclosure are not limited to operating in accordance with these examples. Other embodiments may be utilized and structural changes may be made without departing from the scope of the exemplary embodiments of the present disclosure.

Figure 1:
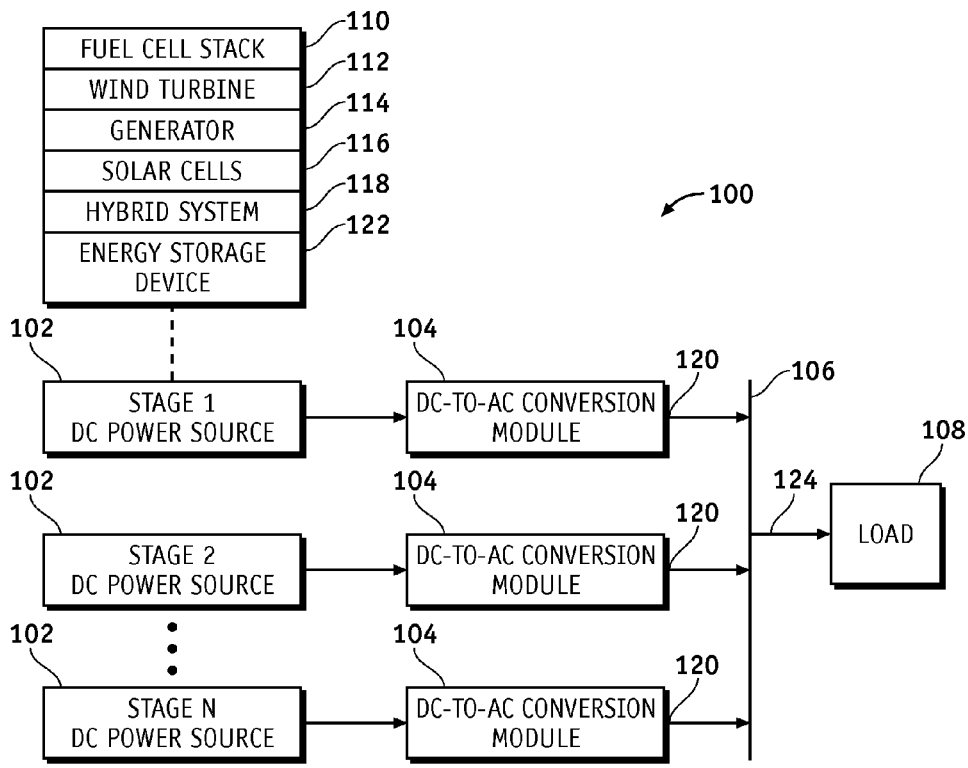
FIG. 1 is an illustration of a schematic functional block diagram of an exemplary power sharing system.

FIG. 1 is an illustration of a schematic functional block diagram of an exemplary power sharing system 100 (system 100). The system 100 comprises a plurality of DC power sources 102, a plurality of DC-to-AC conversion modules 104, an AC power bus 106, and a load 108. The system 100 may comprise N (a positive integer) number of power sharing stages, such as but without limitation, stage 1, stage 2, and the like.

The DC power sources 102 may comprise any of various types of DC power sources such as, for example but without limitation, a fuel cell stack 110, a wind turbine 112, a generator 114, solar cells 116, a hybrid system 118, an energy storage device 122, and the like. The energy storage device 122 may comprise, for example but without limitation, batteries, capacitors, flywheels, and the like. Power for the energy storage device 122 may originate, for example but without limitation, from the AC power bus 106 and/or from one or more of the DC power sources 102. Existing power sharing systems generally require DC power sources be nearly identical in an output power and operating characteristics. In contrast, architectures and methods according to one or more embodiments of the disclosure can allow a mix of power source types and operation characteristics to coexist.

The DC power sources 102 may comprise a load-following power source. A load-following power source may comprise a load-following function that changes its output power to follow the demand pulled from the load 108 coupled to the DC power sources 102. The load-following function may change the output power of at least one of the DC power sources 102. The load-following function may be based on various output characteristics of the at least one of the DC power sources 102, such as but without limitation, output voltage, output current, output power, and the like. For example, if the load 108 causes the output voltage of the at least one of the DC power sources 102 to drop below a threshold, the load-following function increases the output power of the at least one of the DC power sources 102 until the output voltage rises above the threshold. For another example, if the load 108 causes the output voltage of the at least one of the DC power sources 102 to rise above a threshold, the load-following function decreases the output power until the output voltage drops below the threshold. The load-following function may comprise various linear, non-linear, and algorithmic power control methods, such as but without limitation, fuel flow regulation in fuel cells, regulation of solar panel incident radiation angle, and steam supply regulation to a steam turbine coupled to a generator, and the like.

Each of the DC-to-AC conversion modules 104 may receive a DC electrical current from at least one of the DC power sources 102 and outputs an AC electrical current that is compatible with the load 108 to the AC power bus 106. Each of the DC power sources 102 may require power conditioning to correct for, for example but without limitation, voltage and current variation, and the like on an output of the DC power sources 102. The power conditioning adjusts for at least one characteristic of the DC output (i.e., voltage, current, power) of the DC power sources 102. The characteristic of the DC output may comprise, for example but without limitation, magnitude, phase, frequency, DC offset, and the like. In order to condition the output power of the DC power sources 102, existing systems use a power conditioner (i.e., DC-to-DC converter) in series with a DC-to-AC inverter to condition the power (e.g., converting the DC voltage to an acceptable DC voltage range) to be useable by an DC-to-AC inverter before DC-to-AC conversion. In contrast, embodiments of the disclosure operate a DC-to-AC inverter to condition power as well as to convert DC to AC, and thereby reduce an amount of required hardware and thus cost.

The AC power bus 106 couples AC outputs 120 of the DC-to-AC conversion modules 104 to each other to feed a common AC output 124 to the load 108. The AC power bus 106 may be any AC device suitable for coupling the AC outputs of the DC-to-AC conversions modules 104 to the load 108. The AC power bus 106 may be operable to conduct a wide range of load current levels such as, for example but without limitation, 12A, 100A, and the like. The AC power bus 106 current level may depend on a load requirement of the load 108. In general, the AC power bus 106 is suitable for, for example but without limitation, low-voltage or medium-voltage vehicle power systems, industry site power systems, distributed generation applications, and the like. For a low-voltage bus (e.g., below 1 kV), a direct coupling may be used for the AC power bus 106. For a medium-voltage bus (e.g., 1-6 kV), a transformer after the DC-to-AC conversion modules 104 may be used for coupling to the AC power bus 106. Also, the AC power bus 106 is suitable for a single-phase AC load, and can be easily expanded to a three-phase application. The AC power bus 106 may be, for example but without limitation, a 120V single-phase power bus, a 220V three-phase power bus, a 240V three-phase power bus, a 360V three-phase power bus, a 2.4 kV single-phase power bus, a 33 kV three-phase power bus, a 115 kV three-phase power bus, and the like.

The load 108 may be, for example but without limitation, an aircraft power bus, an electrical grid, an automotive electric or hybrid drive, a battery pack, an electric aircraft engine, an electric motor, an ultra capacitor, a laser weapon, an electric tank motor, an electric ship motor, an electromagnetic pulse weapon, and the like. Also, the load 108 may be, for example but without limitation, static, dynamic, variable, periodic, and the like. The load 108 may be, for example but without limitation, a 30 kw motor, a 10 megawatt power line, a 50 kw laser, and the like.

Figure 2:
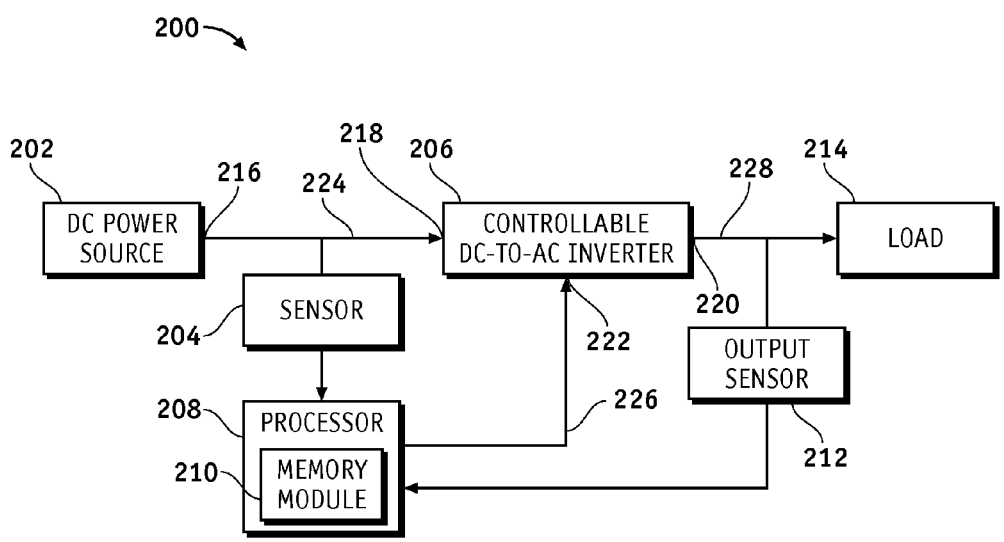
FIG. 2 is an illustration of a schematic functional block diagram of an exemplary single stage of a power sharing architecture according to an embodiment of the disclosure.

FIG. 2 is an illustration of a schematic functional block diagram of an exemplary single stage of a power sharing system 200 (system 200) according to an embodiment of the disclosure. The system 200 may comprise a DC power source 202, a DC sensor 204, a controllable DC-to-AC inverter 206, a processor 208, an AC output sensor 212, and a load 214. The system 200 has a structure that is similar to the system 100, common features, functions, and elements will not be redundantly described herein.

The DC power source 202 may comprise DC power sources such as those describe in the context of discussion of FIG. 1. The DC power source 202 is coupled to the DC sensor 204 and the controllable DC-to-AC inverter 206 via a DC bus 224.

The DC sensor 204 is configured to measure one or more characteristics of a DC electrical output 216 of the DC power source 202, such as but without limitation, voltage, current, output power, and the like. The DC sensor 204 is coupled to the DC bus 224 and the processor 208. The DC sensor 204 may comprise, for example but without limitation, a voltage sensor (e.g., a voltmeter), a current sensor (e.g., an ammeter), a power sensor (e.g., a wattmeter), and the like. In some embodiments, elements of the DC sensor 204 may be coupled in series between the DC power source 202 and the controllable DC-to-AC inverter 206. For example, a current sensor may require a series connection.

The controllable DC-to-AC inverter 206 comprises an electrical device that converts DC electrical power to AC electrical power using electronic circuits. The controllable DC-to-AC inverter 206 comprises a DC input 218, an AC output 220 and a control signal input 222. The controllable DC-to-AC inverter 206 is configured to accept a DC output voltage range of the DC power source 202 at the DC input 218. The DC output voltage range can be measured by the DC sensor 204 and delivered to the DC input 218 via the DC bus 224. The controllable DC-to-AC inverter 206 is configured to deliver an adjustable AC from an AC output 220 (i.e., voltage or current) to the load 214 via an AC power bus 228. The adjustable AC can be synchronized by the processor 208 to a common AC output 322 (FIG. 3) of a multi-source power system 300 (FIG. 3) based on a property of the adjustable AC, such as but without limitation, a voltage, a current, a power, an RMS voltage, an RMS current, and an RMS power. The controllable DC-to-AC inverter 206 adjusts the adjustable AC based on at least one control signal 226 received from the processor 208 at the control signal input 222 as explained below. In this manner, the controllable DC-to-AC inverter 206 is controlled by the processor 208 to provide conditioned power at the AC output 220 according to an embodiment of the disclosure. For example, the adjustable AC at the AC output 220 can be set by the processor 208 to a required frequency, using appropriate transformers, switching, control circuits and algorithms.

The controllable DC-to-AC inverter 206 may be, for example but without limitation, a multilevel array, or a single inverter comprising a controllable output voltage or output current suitable for operation of system 200. There are at least three basic types of DC to-AC inverters: square wave, modified sine wave, and pure sine wave. The square wave may be the simplest and the least expensive type, but it may generally not be used commercially because of low power quality. The modified sine wave topologies (which are actually modified square waves) may produce square waves with some dead spots between positive and negative half-cycles. The modified sine wave topologies may generally be suitable for many electronic loads, although their total harmonic distortion may be about 25%. An output voltage waveform in conventional modified sine wave DC-to-AC inverter circuits may have two levels: zero or peak voltage. By adding another voltage level, a total harmonic distortion can be reduced typically from about 25% to about 6.5%. Periodically connecting the output of the controllable DC-to-AC inverter 206 to a specific voltage level with proper timing can produce a multiple-level waveform which is closer to a sine wave than a conventional modified sine wave. Pure sine-wave inverters produce AC voltage with low total harmonic distortion (i.e., typically below about 3%).

There are various topologies used in inverter circuits. Many commercially manufactured models use a multi-stage concept where a switching pre-regulator steps up a voltage from a DC source to a DC voltage corresponding to the peak value of the desired AC voltage. An output stage may generate a desired AC voltage using, for example but without limitation, a full-bridge or half-bridge configuration. Input to output galvanic isolation is generally provided by a high-frequency transformer in the switching pre-regulator or a low-frequency output transformer. In a low-frequency transformer, the sinusoidal voltage is generally generated on its primary side and transformed to the secondary side.

The controllable DC-to-AC inverter 206 output level can be controlled by the control signal 226 as mentioned above. The control signal 226 may comprise, for example but without limitation, a voltage reference signal, a current reference signal, phase reference, a digital signal, a pulse width modulated signal, and the like. For example but without limitation, the controllable DC-to-AC inverter 206 may receive a voltage reference signal and generate an AC voltage on the AC power bus 228 that is a current amplified replica of the voltage reference signal. The current amplified replica may have, for example but without limitation, the same voltage, phase and frequency of the voltage reference signal, but increased current.

The processor 208 is configured to actively set an amount of power provided by the DC power source 202 through a single conversion stage. The processor 208 generates the control signal 226 for the control signal input 222 of the controllable DC-to-AC inverter 206. The control signal 226 is based on the at least one characteristic of the DC electrical output 216 of the DC power source 202 measured by the DC sensor 204 and at least one characteristic of the AC output 220 measured by the AC output sensor 212. The control signal 226 may be, for example but without limitation, a voltage control signal, a current control signal, a power control signal, and the like. For example, a voltage reference signal may be used by the processor 208 to produce the voltage control signal to obtain a desired voltage at the AC output 220 of the controllable DC-to-AC inverter 206. Similarly, a current reference signal may be used to produce the current control signal to obtain a desired current at the AC output 220 of the controllable DC-to-AC inverter 206. The current control signal and the voltage control signal may be generated via a sine-wave generator circuit. The sine-wave generator circuit may use a pulse-width modulation signal, in which the output voltage and frequency are controlled by varying the duty cycle of the high frequency pulses. A chopped signal thus obtained may then be passed through an output low pass LC-filter to produce a clean sinusoidal output.

The DC sensor 204 can measure at least one characteristic, such as but without limitation, a DC output voltage and a DC output current of the DC electrical output 216 of the DC power source 202. The DC sensor 204 or the processor 208 can then calculate a DC output power for the DC power source 202 based on the DC output voltage and the DC output current. The AC output sensor 212 can measure an AC output voltage and an AC output current of the AC output 220 of the controllable DC-to-AC inverter 206. The AC output sensor 212 or the processor 208 can then calculate an AC output power for the controllable DC-to-AC inverter 206 based on the AC output voltage and the AC output current. The processor 208 can then generate the control signal 226 based on the DC output power of the DC power source 202 and the AC output power of the controllable DC-to-AC inverter 206.

The processor 208 sends the control signal 226 to the control signal input 222 of the controllable DC-to-AC inverter 206 to adjust/set the power level of the adjustable AC at the AC output 220 of the controllable DC-to-AC inverter 206. The processor 208 sets/manages the power level indicated by the control signal 226 based on a property of the DC power source 202 such as, for example but without limitation, efficiency, emissions, power, percent of substantially maximum load, fuel cost, startup time, load-following response time, and substantially maximum output power, and the like. The DC power source 202 can then follow the power level at the DC input 218 based on its voltage and current and deliver an adjusted power to the load 214 accordingly. In this manner, the processor 208 sets the power level at the DC input 218 based on the measured output power from the DC sensor 204 to control an output power of the DC power source 202. The processor 208 can also synchronize the adjustable AC at the AC output 220 in a multi-source system 300 as explained below. The AC output 220 may be coupled to a common AC output 322 of the multi-source power system 300 shown in FIG. 3.

The processor 208 performs a control algorithm to generate the control signal for the controllable DC-to-AC inverter 206 as explained below in the context of the discussion of FIGS. 4-5.

Parameters of system 200 can be stored in the memory module 210 allowing the control algorithm to be readily updated during development in order to interface various configurations of the DC power source 202, or control various configurations of the controllable DC-to-AC inverter 206. The parameters may comprise, for example but without limitation, desired output voltage, desired output current, upper and lower limits of the DC output power 216 of the DC power source 202, scale factors, and the like.

The processor 208 may include any number of distinct processing modules, correlators, or components that are configured to perform the tasks, processes, and operations described in more detail herein. A practical implementation may utilize any number of distinct physical and/or logical processors, which may be dispersed throughout the system 200. In practice, the processor 208 may be implemented or performed with a general purpose processor, a content addressable memory, a digital signal processor, an application specific integrated circuit, a field programmable gate array, any suitable programmable logic device, discrete gate or transistor logic, discrete hardware components, or any combination thereof, designed to perform the functions described herein. The processor 208 may be realized as a microprocessor, a controller, a microcontroller, or a state machine. A processor may also be implemented as a combination of computing devices, e.g., a combination of a digital signal processor and a microprocessor, a plurality of microprocessors, one or more microprocessors in conjunction with a digital signal processor core, or any other such configuration.

The processor 208 may comprise the memory module 210 as a storage device, such as a semiconductor circuit. The memory module 210 is operable to store various kinds of data used for various processes of the system 200. In practical embodiments, the memory module 210 may comprise, for example, a non-volatile memory or storage device (non-volatile semiconductor memory, hard disk device, optical disk device, and the like), a random access storage device (for example, SRAM, DRAM), or any other form of storage medium known in the art. For example, the memory module 210 may store a computer program which is executed by the processor 208, reference signals such as the voltage control signal, the current control signal, the power control signal, sensor data, various kinds of control data, temporary data used in a program process, and the like. The memory module 210 may be coupled to the processor 208 such that the processor 208 can read information from and write information to processor 208. As an example, the processor 208 and memory module 210 may reside in their respective ASICs in which the control signals for controlling the controllable DC-to-AC inverter 206 is stored. The control signals are written in the memory module 210 from a signal generator coupled to the processor 208 or from an input port through the processor 208. The memory module 210 may also be integrated into the processor 208. In an embodiment, the memory module 210 may include a cache memory for storing temporary variables or other intermediate information during execution of instructions to be executed by the processor 208. The memory module 210 may use the non-volatile memory for storing instructions to be executed by the processor 208.

Figure 3:
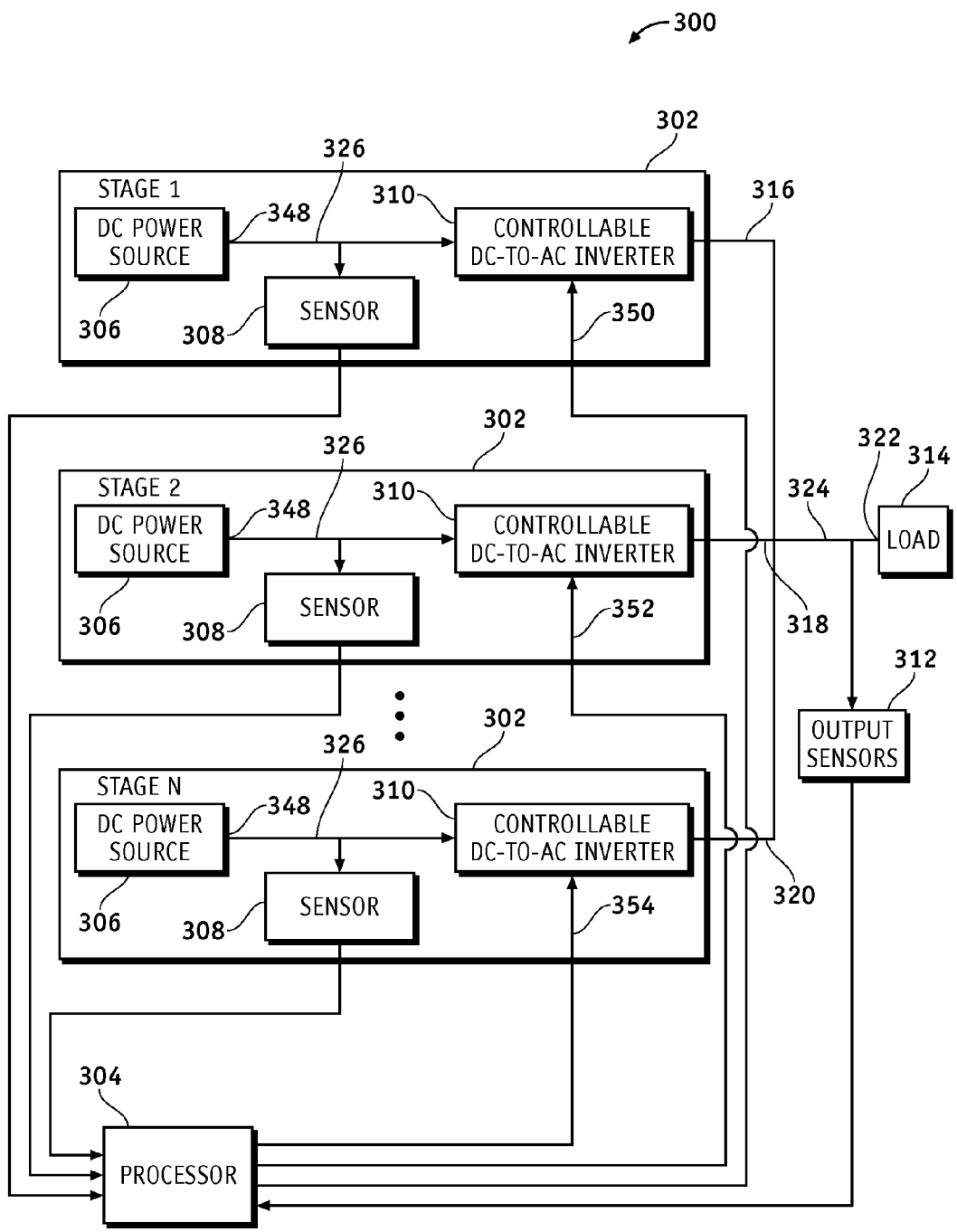
FIG. 3 is an illustration of a schematic functional block diagram of an exemplary multi-stage power sharing network utilizing a power sharing architecture according to an embodiment of the disclosure.

The AC output sensor 212 is configured to measure a characteristic of the AC output 220, such as but without limitation, a voltage, a current, a power, an RMS voltage, an RMS current, and an RMS power. The adjustable AC output on the AC output 220 can be synchronized by the processor 208 to the common output 322 of the multi-source power system 300 (FIG. 3). In this manner, the adjustable AC output on the AC output 220 is synchronized to the common output 322 by matching the voltage, frequency and phase of the adjustable AC output on the AC output 220 to an AC measured on the AC bus 228 by the output sensor 212. In some embodiments, elements of the AC output sensor 212 may be coupled in series between the controllable DC-to-AC inverter 206 and the load 214.

FIG. 3 is an illustration of a schematic functional block diagram of an exemplary multi-stage power sharing network 300 (system 300) utilizing a power sharing architecture according to an embodiment of the disclosure. The system 300 may comprise a plurality of single stages 302, an AC output sensor 312, and a common processor 304. The system 300 has a structure that is similar to the systems 100 and 200, common features, functions, and elements will not be redundantly described herein.

The single stages 302 may each comprise a DC power source 306, at least one DC sensor 308, and a controllable DC-to-AC inverter 310. The common processor 304 is operable to control each of the single stages 302 to work individually or in varying power level combinations with each other. A respective AC output 316/318/320 of each of the single stages 302 is coupled via an AC power bus 324 to a common output 322, which is coupled to a load 314.

The DC power sources 306 may each comprise DC power sources such as those describe in the context of discussion of FIG. 1. Each of the DC power sources 306 is coupled to one of the DC sensors 308 and one of the controllable DC-to-AC inverters 310. Each of the DC power sources 306 comprises a DC electrical output 348 that may be directly or indirectly (e.g., via load-following) controlled by the common processor 304. Each of the DC power sources 306 may be operated individually or in combinations to provide power for the load 314.

Each of the DC sensors 308 functions in a similar manner to the DC sensor 204 explained above, for each of the stages 1-N respectively. Each of the DC sensors 308 is coupled to a DC bus 326 and the common processor 304. In some embodiments, elements of the DC sensors 308 may be coupled in series between their respective DC power source 306 and the controllable DC-to-AC inverter 310. Each of the DC sensors 308 is operable to monitor/measure a DC output power of a respective DC electrical output 348 of the DC power sources 306. Each of the DC sensors 308 may be, for example but without limitation, a voltage and/or a current sensor electrically coupled to the DC electrical output 348 of each of the DC power sources 306 respectively.

Each of the controllable DC-to-AC inverters 310 is configured to accept an output voltage range of the DC power source 306 to which it is coupled. Each of the controllable DC-to-AC inverters 310 is also configured to deliver an adjustable AC which is synchronized to other controllable DC-to-AC inverters 310 operating in the system 300. The adjustable AC may be synchronized based on, for example but without limitation, a voltage, a current, a power, an RMS voltage, an RMS current, and/or an RMS power.

The AC output sensor 312 functions in a similar manner to the AC output sensor 212 explained above in the context of discussion of FIG. 2. The AC output sensor 312 is coupled to the AC power bus 324 and the common processor 304. Since the AC outputs 316/318/320 are coupled to one another by the AC power bus 324, the AC output sensor 312 can measure power on the AC power bus 324. The AC power bus 324 comprises a combined power output from the controllable DC-to-AC inverters 310 in the N stages.

The AC power bus 324 functions in a similar manner to the AC power bus 106 as explained above in the context of discussion of FIG. 2. The AC power bus 324 is coupled to the AC outputs 316/318/320 and the load 314.

The common processor 304 is configured to set a DC output power at the DC electrical output 348 of each of the DC power sources 306 by controlling the DC output power of each of the controllable DC-to-AC inverters 310. The common processor 304 determines a power sharing ratio to set how much is power drawn from each of the N stages and delivered to the load 314. The system 300 allows power sharing between different DC power sources 306, where appropriate power partitioning is necessary to operate within specifications of specific sources used.

The common processor 304 is coupled to the DC sensors 308, the AC output sensor 312, and the controllable DC-to-AC inverters 310. Based on measured data received from the DC sensors 308 and the AC output sensor 312, the common processor 304 may generate control signals 350/352/354 (DC-to-AC inverter control signals) for the controllable DC-to-AC inverters 310 as explained in more detail below in the context of discussion of FIGS. 4-5.

The DC output power at the DC electrical output 348 of each of the DC power sources 306 is controlled by the control signals 350/352/354 generated by the common processor 304. In this manner, power demand of the DC power sources 302 are met by regulating an output of the controllable DC-to-AC inverter 310. The DC output power may be limited to a substantially maximum value or a substantially maximum rate of change in order to protect the DC power source 306. The substantially maximum value can limit the DC output power of each of the controllable DC-to-AC inverters 310. The system 300 is configured to control power demand of the DC power sources 306 by regulating the output of the controllable DC-to-AC inverters 310. In this manner, the need for two separate power converters (i.e. a fuel cell power conditioner and an inverter) is eliminated and both are combined into one unit, thereby increasing the efficiency of the system 300 and decreasing the component count, weight, cost, and complexity. Regulation creates independence between the power sources (e.g., fuel cells) and the management system such as the common processor 304.

Embodiments of disclosure allow power sources of varying sizes (e.g., different sized fuel cells) and/or types (e.g., fuel cells and batteries) to power an electrical bus such as the AC power bus 324. Embodiments of disclosure are operable to provide a dynamically changing power ratio for different modes of operation, such as high efficiency or high power, to account for various power sources operating characteristics. In this manner, the system 300 can substantially maximize efficiency by allowing flexibility in a number and configuration of the DC power sources 306 used. For example, power ratios such as ratios of power outputs at the output of the DC power sources 306 can be dynamically changed based on reference control signals to adjust for characteristics such as, desired voltage and desired current. Furthermore, the system 300 is configured to condition output power of the DC power sources 306 and directly output a sinusoidal AC voltage using single stage of power conversion equipment such as the controllable DC-to-AC inverters 310.

As explained above, adjustable AC output on each of the AC outputs 316/318/320 can be synchronized by the common processor 304 to a common output 322. The adjustable AC output on the AC outputs 316/318/320 can be synchronized to the common output 322 by matching the voltage, frequency and phase of the adjustable AC outputs on the AC outputs 316/318/320 to the AC measured on the AC power bus 324 by the AC output sensor 312.

Benefits of the embodiments of the disclosure over existing solutions comprise, for example: 1) Ability to interface multiple DC power sources 306 such as fuel cell stacks of varying sizes, 2) Ability to interface multiple fuel cell systems and energy source types thereby allowing modularity, 3) Providing scalability by allowing systems of widely varying power levels to work together through use of multilevel converters such as the controllable DC-to-AC inverters 310, and 4) The single stage conversion allows for fewer components and higher efficiency, which may lower cost.

Other benefits of the embodiments of the disclosure comprise rapid development and prototyping, because the system 300 is substantially scalable and flexible. The conversion stage can be provided by any multilevel converter array that meets specifications or even a single custom converter so long as the output voltage can be directly controlled. Functions of the systems 200/300 may be performed through software, and can be changed through software updates.

Another benefit of the embodiments of the disclosure is power sharing between multiple DC power sources such as fuel cell systems. Fuel cell systems and/or stacks require a capability of sharing the load power but may also require dynamic changes to the output of the power. Functions that keep fuel cells within their electrical operating envelope can protect the fuel cells and improve efficiency even without direct feedback to a control system by controlling the output of each of the fuel cell systems.

Figure 4:
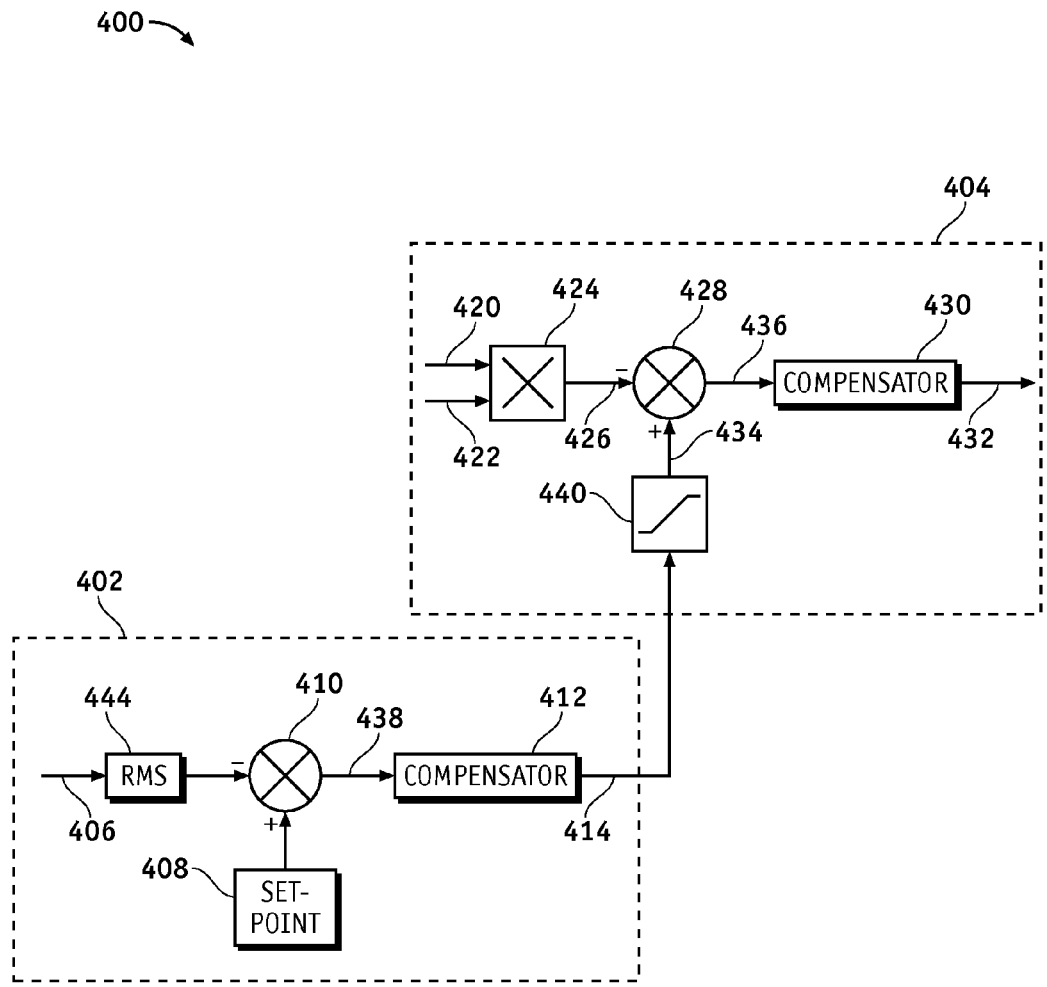
FIG. 4 is an illustration of a schematic functional block diagram showing an exemplary control system for a single stage of a power sharing architecture according to an embodiment of the disclosure.

FIG. 4 is an illustration of a schematic functional block diagram showing an exemplary control system 400 for a single stage of a power sharing architecture according to an embodiment of the disclosure. The control system 400 is configured to receive measured values of output voltage and output current of the DC power source 202/306 from the DC sensor 204/308, and of the adjustable AC from AC output 220 or 316/318/320 of the controllable DC-to-AC inverter 206/310 to generate the control signal 226 or 350/352/354. The control signal 226 or 350/352/354 can be used by the processor 208/common processor 304 to actively set an amount of power provided by the DC power source 202/306 through a single conversion stage using the controllable DC-to-AC inverter 206/310.

Parameters and control algorithms of the control system 400 can be stored in the processor 208/common processor 304. The control system 400 comprises an outer control loop 402 and an inner control loop 404.

The outer control loop 402 comprises AC sensor output 406, a set point 408, a difference calculator 410, a compensator 412, and a power command output 414. The outer control loop 402 is configured to receive the AC sensor output 406 from the output sensor 312 coupled to the AC power bus 228/324, and calculate an RMS value 444 of the AC sensor output 406. The outer control loop 402 is also configured to calculate a difference (via the difference calculator 410) between a set point 408 and the RMS value 444 to obtain a difference value 438. The set point may be, for example but without limitation, 120V AC, 240V AC, and the like depending on the load 214/314. The difference value 438 is scaled by the compensator 412 to obtain a power command output 414 required to deliver a desired AC voltage to the load 214/314.

The compensator 412 is used to adjust a frequency response of the outer control loop 402, based on specific properties of controlled equipment such as the controllable DC-to-AC inverters used in each stage 1-N (FIG. 3), in order to obtain a stable operation and fast regulation. An uncompensated control loop may cause controlled equipment to exhibit non-optimized behaviors such as oscillations, slow response, or incorrect operation. The compensator 412 causes the output of the inner power control loop 404 to quickly and accurately follow the power command output 414. In this manner, the outer control loop 402, the AC output 220/316/318/320 of the controllable DC-to-AC inverter 206/310 is controlled to a desired constant value, e.g., an RMS voltage. The compensator 412 may be, for example but without limitation, a lookup table, an algorithm, a proportional integral function, and the like that may be stored in the processor 208/common processor 304.

The inner control loop 404 comprises the power command output 414, a DC output voltage 420, a DC output current 422, a multiplier 424, a calculated DC output power 426, a difference calculator 428, a raw control signal value 436 (power difference), a compensator 430, a control signal output 432, and a rate limiter 440. The AC output power of each of the controllable DC-to-AC inverters 206/310 may be limited to a substantially maximum value or a substantially maximum rate of change in order to protect the DC power source 202/306. Therefore, the power command output 414 is rate limited by the rate limiter 440 to obtain a rate limited power command output 434. The rate limiter may range from, for example but without limitation 0-10 kw/s depending on the load 214/314. The DC power source output voltage 420 and the DC power source output current 422 are multiplied by the multiplier 424 to obtain the calculated DC output power 426. A difference between the rate limited scaled power command output 434 and the calculated DC output power 426 is calculated by the difference calculator 428 to obtain the raw control signal value 436 (a power difference value 436). The power difference value 436 is scaled by the compensator 430 to obtain the control signal output 432 for input to the control signal input 222 of the controllable DC-to-AC inverter 206/310.

The compensator 430 is used to adjust a frequency response of the inner power control loop 404, based on specific properties of the controlled equipment such as the controllable DC-to-AC inverters in each stage 1-N (FIG. 3), in order to obtain a stable operation and fast regulation. As mentioned above, an uncompensated control loop may cause the controlled equipment to exhibit non-optimized behaviors such as oscillations, slow response, or incorrect operation. The compensator 430 causes the output 220/316/318/320 of the controllable DC-to-AC inverter 206/310 to quickly and accurately follow the control signal output 432. In the inner power control loop 404, an output power of each controllable DC-to-AC inverter 206/310 and each of the DC power sources 202/306 follows the control signal 226/350/352/354 accurately. The compensator 430 may be, for example but without limitation, a lookup table, an algorithm, a proportional integral function, and the like stored in the processor 208/common processor 304.

The control system 400 sends the control signal output 432 to the control signal input 222 to set the power level at the DC input 218 and to control the adjustable AC at the AC output 220 of each of the controllable DC-to-AC inverters 206/310. Each of the DC power sources 202/306 may then follow the power level at the DC input 218 to deliver a required amount of power to the load 214/314. In this manner, the processor 208/common processor 304 actively manages an amount of power that may be provided by the DC power sources 202/302 in the multi-source power system 300 as explained below, thereby regulating output power per each of the N stages shown in FIG. 5.

Figure 5:
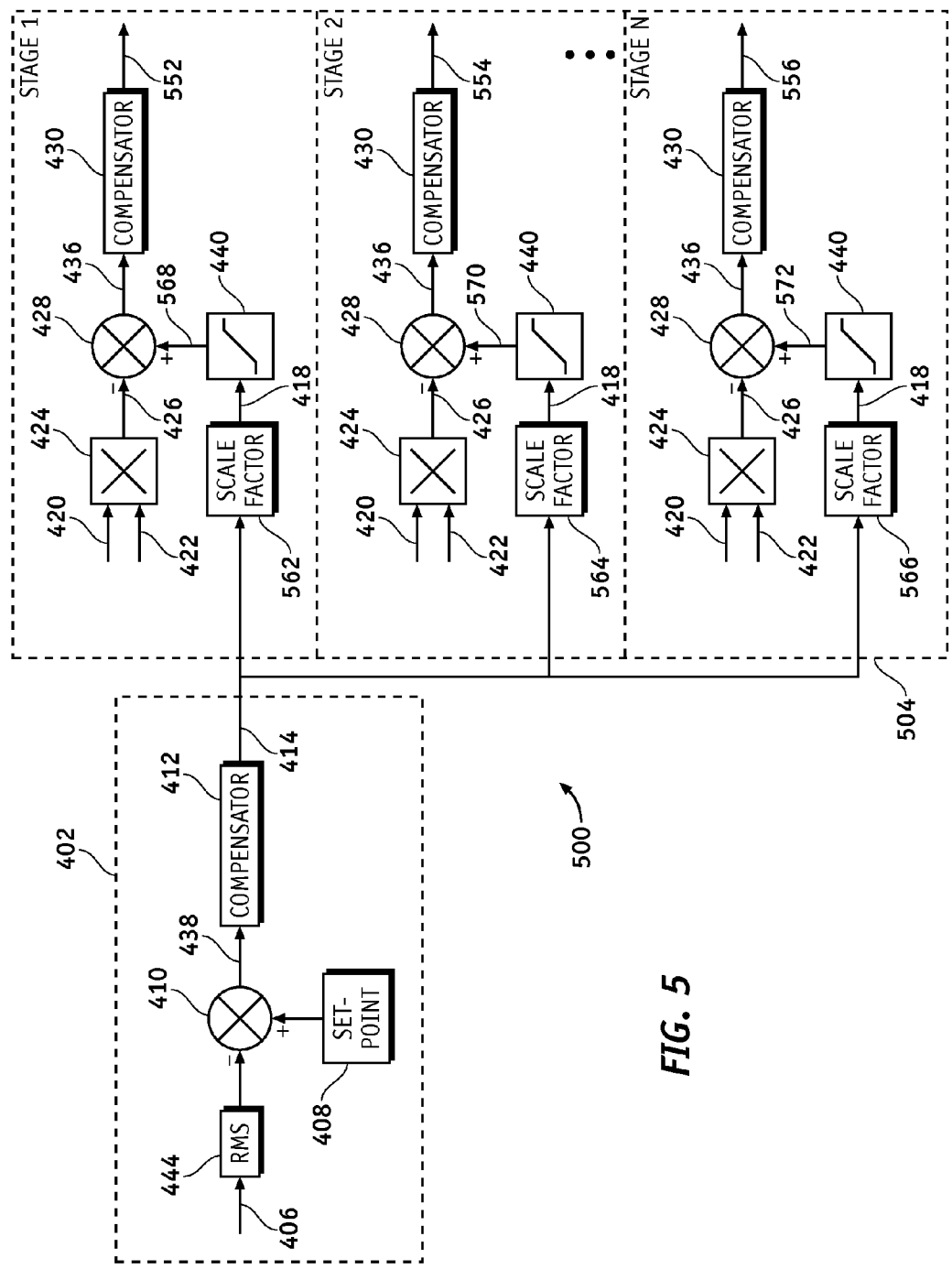
FIG. 5 is an illustration of a schematic functional block diagram showing an exemplary control system for a multi-stage power sharing architecture according to an embodiment of the disclosure.

FIG. 5 is an illustration of a schematic functional block diagram showing an exemplary control system 500 for an N-stage power sharing architecture according to an embodiment of the disclosure. The control system 500 is configured to receive measured characteristics such as measured values of output voltage and output current of the DC power sources 306 from the DC sensors 308, and of the adjustable AC from AC power bus 324 to generate control signals 350/352/354 for each of the controllable DC-to-AC inverters 310 respectively. The control signals 350/352/354 can be used by the common processor 304 to actively set an amount of power provided by the DC power sources 306 through each conversion stage 302 using the controllable DC-to-AC inverters 310.

The control system 500 comprises the outer control loop 402 and a plurality of inner power control loops 504. The control system 500 has a structure that is similar to the control system 400, and common features, functions, and elements will not be redundantly described herein. The outer control loop 402 outputs a power command output 414, which is used by each of the inner power control loops 504 each of which is configured to drive each of the controllable DC-to-AC inverters 310 via control signal outputs 552/554/556 to actively manage the amount of power that may be provided by the DC power sources 306 to regulate the output power per each of the N stages.

Each inner power control loop 504 corresponds to and controls each of a plurality of stages 1-N, and is configured to generate a control signal for the respective controllable DC-to-AC inverters 310. In this manner, the power command output 414 is scaled by a scaling factor 562/564/566 depending on the power sharing ratio assigned to each of the controllable DC-to-AC inverters 310 for each stage 1-N. For example, for the three stages (N=3) shown in the embodiment of FIG. 5, the stage 1 scaling factor 562 may be equal to about 0.1 corresponding to about 10% of the total power delivered to the load 314, the stage 2 scaling factor 564 may be equal to about 0.3 corresponding to about 30% of the total power delivered to the load 314, and the stage 3 (N=3) scaling factor 566 may be equal to about 0.6 corresponding to about 60% of the total power delivered to the load 314.

Figure 6:
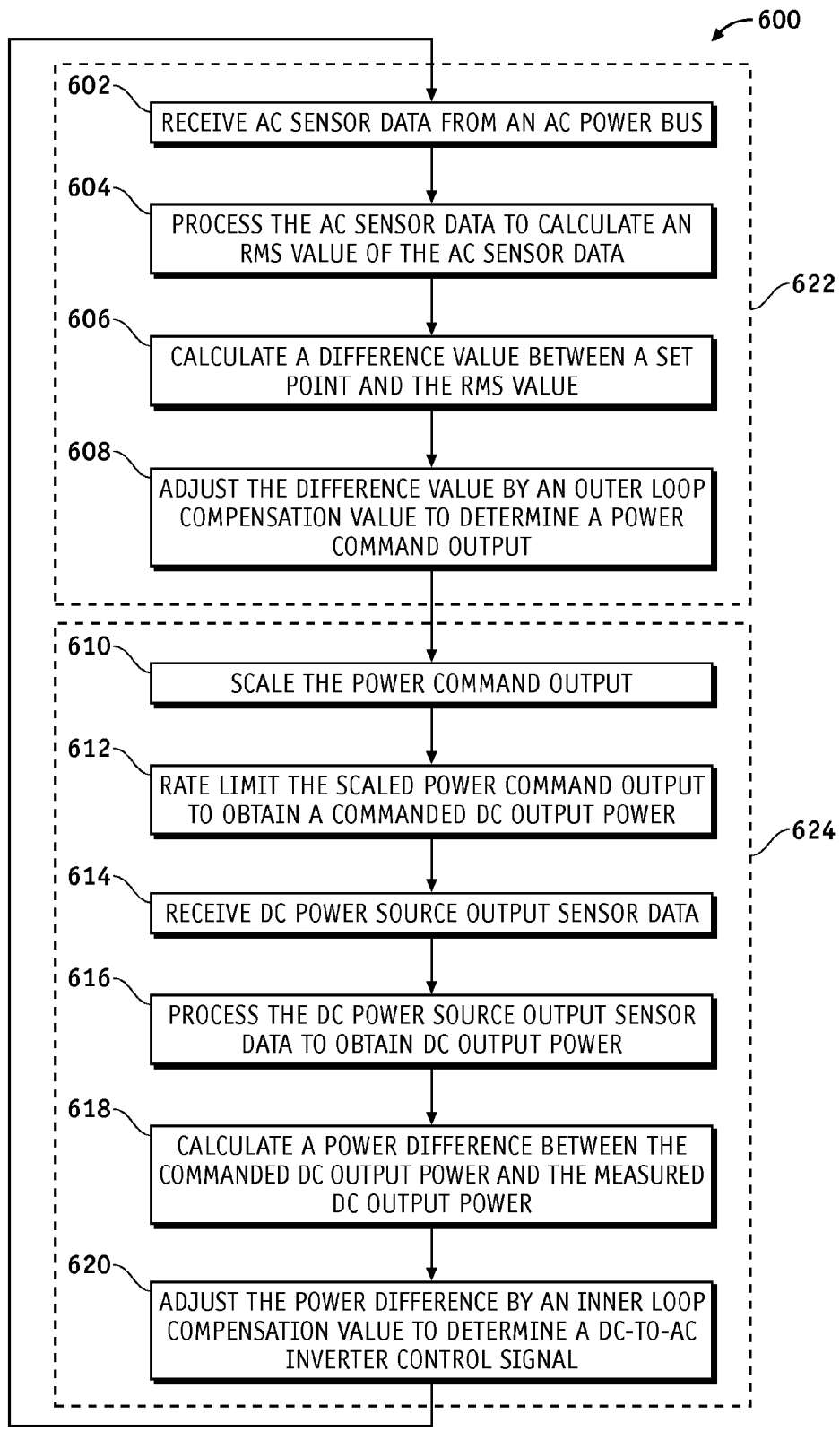
FIG. 6 is an illustration of a lower-level control algorithm flowchart showing an exemplary process for providing power sharing utilizing a power sharing architecture according to an embodiment of the disclosure.
Figure 7:
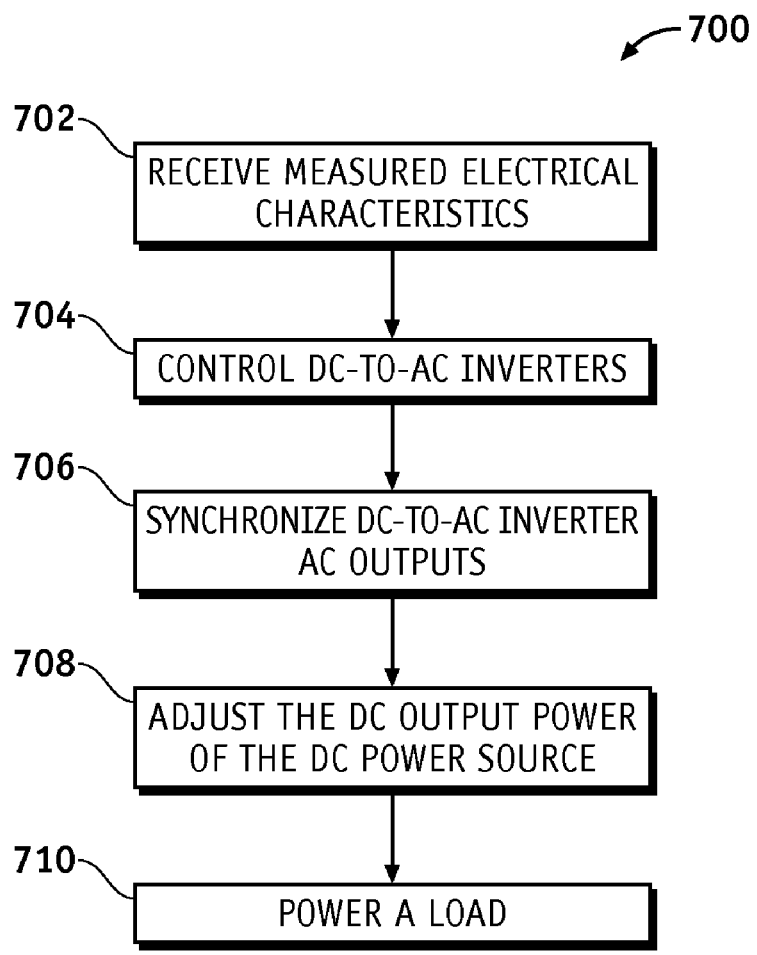
FIG. 7 is an illustration of a high-level control algorithm flowchart showing an exemplary process for providing power sharing utilizing a power sharing architecture according to an embodiment of the disclosure.

FIGS. 6 and 7 are illustrations of a lower-level control algorithm flowchart and a high-level control algorithm flowchart respectively showing exemplary processes 600-700 for providing power sharing utilizing a power sharing architecture according to two embodiments of the disclosure. The various tasks performed in connection with processes 600-700 may be performed by software, hardware, firmware, or any combination thereof. For illustrative purposes, the following description of processes 600-700 may refer to elements mentioned above in connection with FIGS. 3-5. In practical embodiments, portions of processes 600-700 may be performed by different elements of power sharing architectures 300-500. Processes 600-700 may have functions, material, and structures that are similar to the embodiments shown in FIGS. 2-5. Therefore common features, functions, and elements may not be redundantly described here.

Process 600 may begin by performing an outer control loop 622 to determine a power command output 414. As a part of the outer control loop 622, the process 600 receives AC sensor data from the AC power bus 324 (task 602). For example, the output sensor 312 may measure AC sensor data from the AC power bus 324, and the measured AC sensor data (i.e., AC sensor output 406) may be received by the outer control loop 402/622. The AC sensor data may be, for example but without limitation, a voltage, a current, a power, an RMS voltage, an RMS current, an RMS power, and the like.

As a further part of the outer control loop 622, the process 600 may continue by processing the AC sensor data (task 604) to obtain/calculate processed AC data. In this manner, process 600 may calculate an RMS value 444 of the AC sensor output 406, which may be, for example but without limitation, a voltage level, a current level, a power level, and the like.

As a further part of the outer control loop 622, the process 600 may then calculate a difference value between a set point and the processed AC data (task 606). In this manner, process 600 may calculate the difference value 438 between the set point 408 and the processed AC data such as the RMS value 444.

As a further part of the outer control loop 622, the process 600 may continue by determining a power command output from the difference value (task 608). In this manner, process 600 may determine the power command output 414 by the compensator 412 scaling/adjusting the difference value 438 by an outer loop compensation value. For example but without limitation, the compensator 412 may scale the difference value 438 linearly, nonlinearly, by a step function, and the like. As mentioned above, the compensator 412 chooses the scaling/outer loop compensation value to cause the output of the inner power control loop 404 to quickly and accurately follow the power command output 414.

Process 600 may then perform an inner power control loop 624 for each of the N-stages substantially simultaneously to determine the control signal output 552/554/556 (DC-to-AC inverter control signal 350/352/354) for controlling the controllable DC-to-AC inverters 206/310 for each of the N-stages respectively. As a part of the inner power control loop 624, process 600 may continue by scaling the power command output 414 by the scaling factor 562/564/566 (task 610).

As a further part of the inner power control loop 624, process 600 may then continue by rate limiting the scaled power command output 418 to obtain a commanded DC output power (rate limited scaled power command output) 568/570/572 (task 612).

As a further part of the inner power control loop 624, process 600 may then continue by receiving the DC power source 216/306 output sensor data (measured DC data) from the DC sensor 204/308 (task 614). The DC power source 216/306 output sensor data may comprise, for example and without limitation, the DC power source 216/306 output voltage 420, the DC power source 216/306 output current 422, the DC power source 216/306 output power, and the like.

As a further part of the inner power control loop 624, process 600 may then continue by processing the DC power source 216/306 output sensor data to obtain a measured DC output power 426 (task 616). For example, process 600 may receive the DC power source output voltage 420 and the DC power source output current 422, and multiply them with each other by the multiplier 424 to obtain a measured DC output power 426. Alternatively, process 600 may receive the measured DC output power 426 directly from the DC sensor 204/308.

As a further part of the inner power control loop 624, process 600 may then continue by calculating a power difference (e.g., power difference value 436) between the commanded DC output power 568/570/572 and the measured DC output power 426 (task 618) for each of the N stages respectively.

As a further part of the inner power control loop 624, process 600 may then continue by determining the control signal output 552/554/556 for controlling the controllable DC-to-AC inverters 206/310 based on the power difference value 436 (task 620). For example, process 600 may determine the control signal output 552/554/556 by the compensator 430 scaling/adjusting the power difference value 436 by an inner loop compensation value. For example but without limitation, the compensator 430 may scale the power difference value 436 linearly, nonlinearly, by a step function, and the like. The compensator 430 chooses the inner loop compensation value (scaling) to cause the AC output 220/316/318/320 of the controllable DC-to-AC inverter 206/310 to quickly and accurately follow the control signal output 552/554/556. Process 600 may then lead back to task 602.

As shown in FIG. 7, process 700 may begin by receiving measured electrical characteristics of DC electrical outputs 348 of each of the DC power sources 306 respectively (task 702). Process 700 may then continue by using the DC-to-AC inverter control signal 350/352/354 (552/554/556 in FIG. 5)

to control each of the DC-to-AC inverters 310 (task 704) based on the measured electrical characteristics to obtain DC-to-AC inverter adjustable AC output on the AC outputs 316/318/320. Process 700 may then continue by synchronizing the DC-to-AC inverter AC outputs 316/318/320 (task 706) to a common AC output 324. Process 700 may then continue by adjusting the DC output power of each of the DC power sources 306 using the control signal output 552/554/556 (task 708) respectively, and power a load 314 (task 710). In this manner, process 700 actively manages the amount of power that may be provided by the DC power sources 302 to regulate the DC output power at the DC electrical output 348 per each of the N stages as explained above.

In this way, embodiments of the disclosure provide a power electronics and control architecture for powering an AC load from multiple DC sources such as multi-fuel cell stack power systems through a single conversion stage, thereby reducing the amount of required hardware and thus cost. Embodiments of the disclosure manage the electrical power, through a power inverter from, for example but without limitation, fuel cell stacks or other DC power sources in such a way as to directly power an AC load by modulating an output of the power inverter. Embodiments of the disclosure also provide dynamic power sharing between DC power sources such as fuel cells and conditioning for a power AC bus. The embodiments allow power sharing between various power sources where appropriate power partitioning is necessary to operate within the specifications of the specific power sources used. The embodiments can improve efficiency, extend cycle life, condition power to keep within bus limits, and manage an AC load during different system operation modes.

While at least one example embodiment has been presented in the foregoing detailed description, it should be appreciated that a vast number of variations exist. It should also be appreciated that the example embodiment or embodiments described herein are not intended to limit the scope, applicability, or configuration of the subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

The above description refers to elements or nodes or features being "connected" or "coupled" together. As used herein, unless expressly stated otherwise, "connected" means that one element/node/feature is directly joined to (or directly communicates with) another element/node/feature, and not necessarily mechanically. Likewise, unless expressly stated otherwise, "coupled" means that one element/node/feature is directly or indirectly joined to (or directly or indirectly communicates with) another element/node/feature, and not necessarily mechanically. Thus, although FIGS. 1-5 depict example arrangements of elements, additional intervening elements, devices, features, or components may be present in an embodiment of the disclosure.

Terms and phrases used in this document, and variations thereof, unless otherwise expressly stated, should be construed as open ended as opposed to limiting. As examples of the foregoing: the term "including" should be read as mean "including, without limitation" or the like; the term "example" is used to provide exemplary instances of the item in discussion, not an exhaustive or limiting list thereof; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should also be read as "and/or" unless expressly stated otherwise. Furthermore, although items, elements or components of the disclosure may be described or claimed in the singular, the plural is contemplated to be within the scope thereof unless limitation to the singular is explicitly stated. The presence of broadening words and phrases such as "one or more," "at least," "but not limited to" or other like phrases in some instances shall not be read to mean that the narrower case is intended or required in instances where such broadening phrases may be absent.

The invention claimed is:

1. A method of controlling a power electronics and control system, the method comprising:
   receiving AC sensor data from an AC power bus coupled to an AC output of a DC- to-AC inverter;
   calculating a difference value between a set point and an RMS value of the AC sensor data;
   adjusting the difference value by an outer loop compensation value to determine a power command output;
   determining a DC-to-AC inverter control signal based on the power command output;
   calculating a power difference between a commanded DC output power and a measured DC output power; and
   adjusting the power difference by an inner loop compensation value to determine the DC-to-AC inverter control signal.

2. The method according to claim 1, wherein the AC sensor data comprises at least one of the group consisting of: a voltage, a current, a power, an RMS voltage, an RMS current, and an RMS power.

3. A method of controlling a power electronics and control system, the method comprising:
   receiving AC sensor data from an AC power bus coupled to an AC output of a DC-to-AC inverter;
   calculating a difference value between a set point and an RMS value of the AC sensor data;
   adjusting the difference value by an outer loop compensation value to determine a power command output;
   determining a DC-to-AC inverter control signal based on the power command output;
   scaling the power command output by a scaling factor to obtain a scaled power command output;
   rate limiting the scaled power command output by a rate limiter to obtain a commanded DC output power;
   processing a DC power source output sensor data to obtain a measured DC output power;
   calculating a power difference between the commanded DC output power and the measured DC output power; and
   adjusting the power difference by an inner loop compensation value to determine the DC-to-AC inverter control signal.

4. The method according to claim 3, wherein the AC sensor data comprises at least one of the group consisting of: a voltage, a current, a power, an RMS voltage, an RMS current, and an RMS power.

5. A method of controlling a power electronics and control system, the method comprising:
- receiving AC sensor data from an AC power bus coupled to an AC output of a DC-to-AC inverter;
- calculating a difference value between a set point and an RMS value of the AC sensor data;
- adjusting the difference value by an outer loop compensation value to determine a power command output;
- determining a DC-to-AC inverter control signal based on the power command output;
- receiving measured electrical characteristics of DC outputs of each of a plurality of DC power sources respectively;
- controlling each of a plurality of DC-to-AC inverters via each of a plurality of DC-to-AC inverter control signals respectively based on the measured electrical characteristics to obtain a plurality of DC-to-AC inverter AC outputs, the DC-to-AC inverters coupled to each of the DC power sources respectively; and
- synchronizing each of the DC-to-AC inverter AC outputs to a common AC output.

6. The method according to claim 5, further comprising adjusting a DC output power of at least one of the DC power sources.

7. The method according to claim 2, wherein adjusting the output power is based on a property of the DC power sources, the property comprising at least one of the group consisting of: efficiency, emissions, power cost, percent of substantially maximum load, fuel cost, startup time, load-following response time, and substantially maximum output power.

8. The method according to claim 2, wherein adjusting the output power comprises controlling a DC input to a DC-to-AC inverter coupled to the at least one of the DC power sources.

9. The method according to claim 5, wherein the AC sensor data comprises at least one of the group consisting of: a voltage, a current, a power, an RMS voltage, an RMS current, and an RMS power.

10. The method according to claim 5, wherein the DC power sources comprise at least one of the group consisting of: a fuel cell stack, a wind turbine, a generator, solar cells, a hybrid system, and an energy storage device.

* * * * *